(12) United States Patent
Makino et al.

(10) Patent No.: US 9,383,455 B2
(45) Date of Patent: Jul. 5, 2016

(54) RADIATION MEASUREMENT APPARATUS

(71) Applicant: KABUSHIKI KAISHA TOSHIBA, Minato-Ku (JP)

(72) Inventors: Shunichiro Makino, Yokosuka (JP); Toru Onodera, Yokohama (JP); Yoshinori Satoh, Yokohama (JP); Naoto Kume, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 141 days.

(21) Appl. No.: 14/348,393

(22) PCT Filed: Sep. 28, 2012

(86) PCT No.: PCT/JP2012/075221
§ 371 (c)(1),
(2) Date: Mar. 28, 2014

(87) PCT Pub. No.: WO2013/047824
PCT Pub. Date: Apr. 4, 2013

(65) Prior Publication Data
US 2014/0231646 A1    Aug. 21, 2014

(30) Foreign Application Priority Data

Sep. 30, 2011 (JP) .................................. 2011-217997

(51) Int. Cl.
*G01T 1/17* (2006.01)
*G01T 1/172* (2006.01)

(52) U.S. Cl.
CPC ................. *G01T 1/172* (2013.01); *G01T 1/171* (2013.01)

(58) Field of Classification Search
CPC ............. G01T 1/02; G01T 1/04; G01T 1/023; G01T 1/026; G01T 1/17; G01T 1/171; G01T 1/178; G01T 1/172
See application file for complete search history.

(56) References Cited

U.S. PATENT DOCUMENTS 3,924,106 A * 12/1975 Keefe ...................... G01T 1/178
377/19

(Continued)

FOREIGN PATENT DOCUMENTS

JP     4 36682       2/1992
JP     2004 529367   9/2004

OTHER PUBLICATIONS

Office Action issued Jul. 14, 2015 in Japanese Patent Application No. 2011-217997.
International Preliminary Report on Patentability issued Apr. 10, 2014 in PCT/JP2012/075221 filed on Sep. 28, 2012 (English translation only).

(Continued)

*Primary Examiner* — Casey Bryant
(74) *Attorney, Agent, or Firm* — Oblon, McClelland, Maier & Neustadt, L.L.P.

(57) ABSTRACT

A radiation measurement apparatus includes a radiation sensor that generates a detection signal, a first counter unit that counts the number of the detection signal, an oscillator that generates periodic signal with predetermined period, an AND circuit that outputs logical product obtained by performing AND operation between the detection signal and the periodic signal, a second counter unit that counts the number of a signal output from the AND circuit, and a display unit that displays a value counted by the first counter unit when a value counted by the second counter unit is less than predetermined value and a value being different from the value counted by the first counter unit when the value counted by the second counter unit is not less than predetermined value.

11 Claims, 5 Drawing Sheets

(56) References Cited

U.S. PATENT DOCUMENTS

| | | | | |
|---|---|---|---|---|
| 4,485,442 | A | * | 11/1984 | Snaper ................ G01T 1/17 250/336.1 |
| 6,609,075 | B1 | * | 8/2003 | Warburton ............ G01T 1/17 702/22 |
| 2006/0276706 | A1 | * | 12/2006 | Klein ................ G01T 1/171 600/407 |

OTHER PUBLICATIONS

Written Opinion issued Oct. 23, 2012 in PCT/JP2012/075221 filed on Sep. 28, 2012 (English translation only).

International Search Report Issued Oct. 23, 2012 in PCT/JP12/075221 Filed Sep. 28, 2012.

* cited by examiner

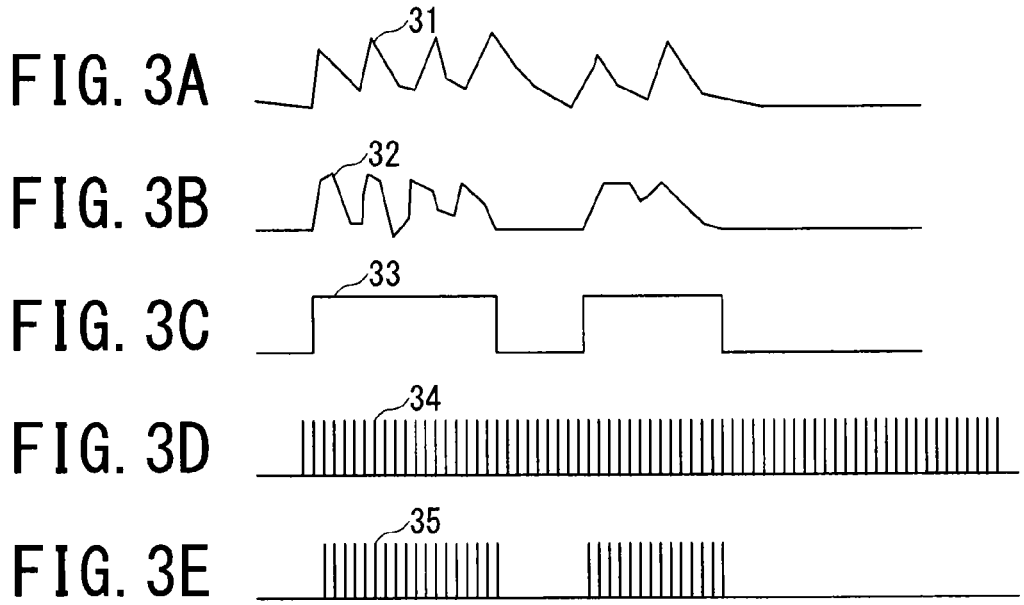
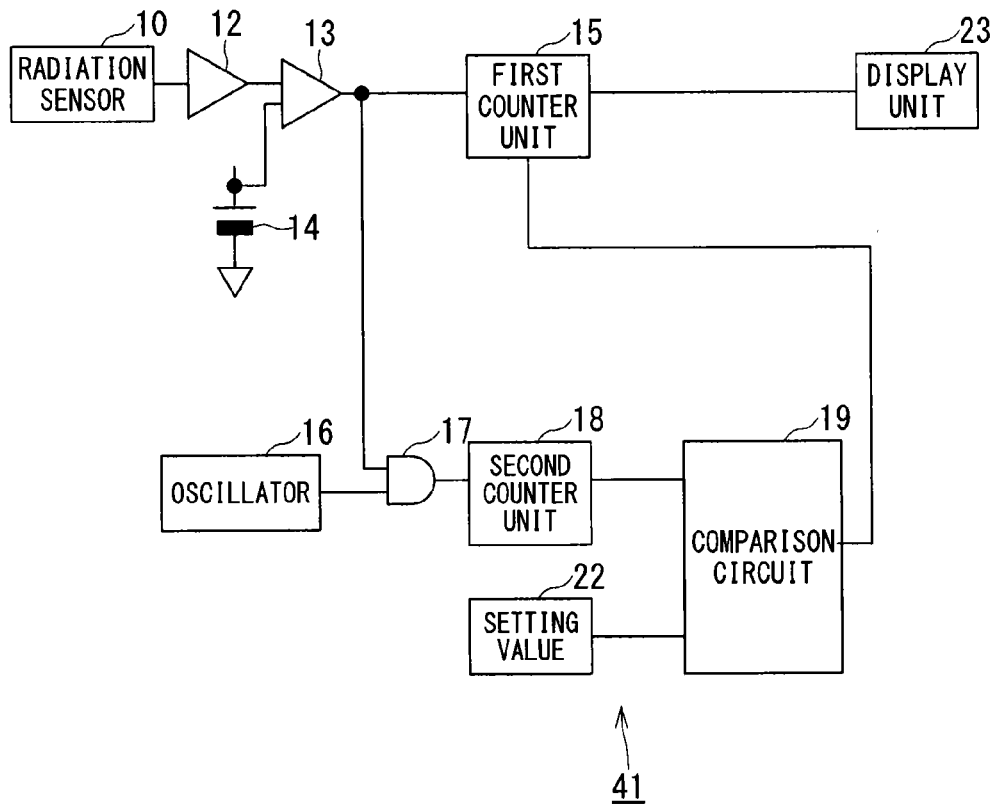
FIG. 4

RADIATION MEASUREMENT APPARATUS

TECHNICAL FIELD

The present invention relates to an apparatus that detects and counts radiation.

BACKGROUND ART

In a facility which treats radiation material, such as nuclear power plant or the like, in a case where an accident occurs, there is a possibility which flies (scatters) a radiation material having strong radioactivity over a wide range. Accordingly, it occurs to need to widely research whether the radiation material is present or not. Thus, a result of the research, if the radiation material is present, it is necessary to remove the radiation material.

Many human resources are necessary for a measurement whether radiation material is present or not. Accordingly, the worker having a little knowledge and skill may need to measure whether radiation material is present or not. In this case, some objects may occur as follows.

If radiation is detected in the radiation measurement apparatus, electric pulse is generated. The generated pulse is counted by a latter counting circuit. In a case where radioactivity is strong, the number of the radiation becomes large number. Since an interval between electric pulses narrows, the radiation measurement apparatus becomes a state (which will be hereinafter referred to as "pile-up") where the electric pulses overlap each other.

If the pile-up is occurred in the radiation measurement apparatus, since a plurality of the pulses which overlaps each other are considered as single (one) pulse, in fact, a value (which will be hereinafter referred to as "count value") counted by the counting circuit becomes smaller than actual radiation number detected by the radiation measurement apparatus. Further, in a case where the pile-up occurs by overlapping all electric pulses, the count value becomes zero (0). Thus, even though there is the radiation material having strong radioactivity in fact, there is a possibility being determined that here radioactivity is weak. In case of being determined that here radioactivity is weak, because the radiation material is not eliminated, a risk led to radiation exposure may be occurred.

Conventionally, a technique for detecting pile-up and a technique for preventing from pile-up are proposed (for example, refer to patent documents 1 and 2).

Further, if a count number of the counting circuit within measurement time exceeds over a measurement capacity of the counting circuit, because it occurs digit overflow (which will be hereinafter referred to as "overflow"), the count number output from the counting circuit becomes less than the count number input to the counting circuit. For example, in a case where an 8 bit counting circuit is used, maximum count value (measurement capacity) is 255. Accordingly, if the count value of the counting circuit reaches 256 within measurement time, the count value returns from 255 to 0. In above-described case, as same case as pile-up, it may be wrongly determined that a radioactivity is weak. Accordingly, the wrong determination is caused a risk led to radiation exposure.

Conventionally, for the sake of avoiding fault-measurement caused by the overflow, in the event that the counting circuit is overflowed, a technique for displaying contents that the counting circuit is overflowed is proposed (refer to non-patent document 1).

PRIOR ART DOCUMENT

Patent Document

Patent Document 1: Publication of (Unexamined) Patent Application No. Heisei 07-072252
Patent Document 2: Publication of (Unexamined) Patent Application No. 2009-18154

Non-Patent Document

Non-Patent Document 1: http://www.clearpulse.co.jp/jpn/product/plist_E/plistE1.html

DESCRIPTION OF INVENTION

Problems to be Solved by Invention

Although conventional technique can detect pile-up and prevent from occurring pile-up, conventional technique leads apparatus to be complicated and enlarged. Further, although the radiation measurement apparatus displays over-flow occurrence in case of occurring over-flow, count display in the radiation measurement apparatus over-flows. Therefore, it is difficult for an operator that is not familiar with treatment of the radiation measurement apparatus for an operator to determine whether the overflow is occurred.

The present invention has been made in consideration of the circumstances mentioned above, and an object thereof is to provide a radiation measurement apparatus which can prevent from wrong determination of radiation without depending on or knowledge, as to the radiation measurement of the operator.

Means for Solving Problem

In order to solve the problem in the conventional art mentioned above, the present invention provides a radiation measurement apparatus including: a sensor that generates a detection signal in case of detecting a radiation; a first counter that counts the number of the detection signal; an oscillator that generates a periodic signal with predetermined period; an AND circuit that outputs logical product obtained by operating AND operation between the detection signal and the periodic signal; a second counter that counts the number of a signal output from the AND circuit; and a display unit that displays a count value of the first counter in a case where a count value of the second counter is less than a first predetermined value and a value which is different from the count value of the first counter in a case where the count value of the second counter is not less than the first predetermined value.

Effect of Invention

A radiation measurement apparatus according to the present invention can prevent an operator from faultily recognizing radioactivity without depending on skill and knowledge level, regarding radiation measurement, of the operator.

BRIEF DESCRIPTION OF DRAWINGS

FIG. 2 (which includes FIGS. 2A to 2E) is an explanation view illustrating an aspect of a pulse generated in a comparator, an oscillator, and an AND circuit, in the event that a pile-up is not generated. Here.

FIG. 3 (which includes FIGS. 3A to 3E) is an explanation view illustrating an aspect of a pulse generated in a comparator, an oscillator, and an AND circuit, in the event that a pile-up is generated. Here, FIG. 3A is a view illustrating an electric pulse output from a radiation sensor, FIG. 3B is a view illustrating formed pulse formed and output from, FIG. 3C is a view illustrating detection pulse output from the comparator, FIG. 3D is a view illustrating periodic pulse output from the oscillator, and FIG. 3E is a view illustrating an output signal output from the AND circuit.

FIG. 4 is a circuit configuration diagram of a radiation measurement apparatus as another example of the first embodiment.

EMBODIMENT FOR CARRYING OUT THE INVENTION

First Embodiment

A first embodiment of a radiation measurement apparatus according to the present invention will be described with reference to the accompanying drawings.

Figure 1:
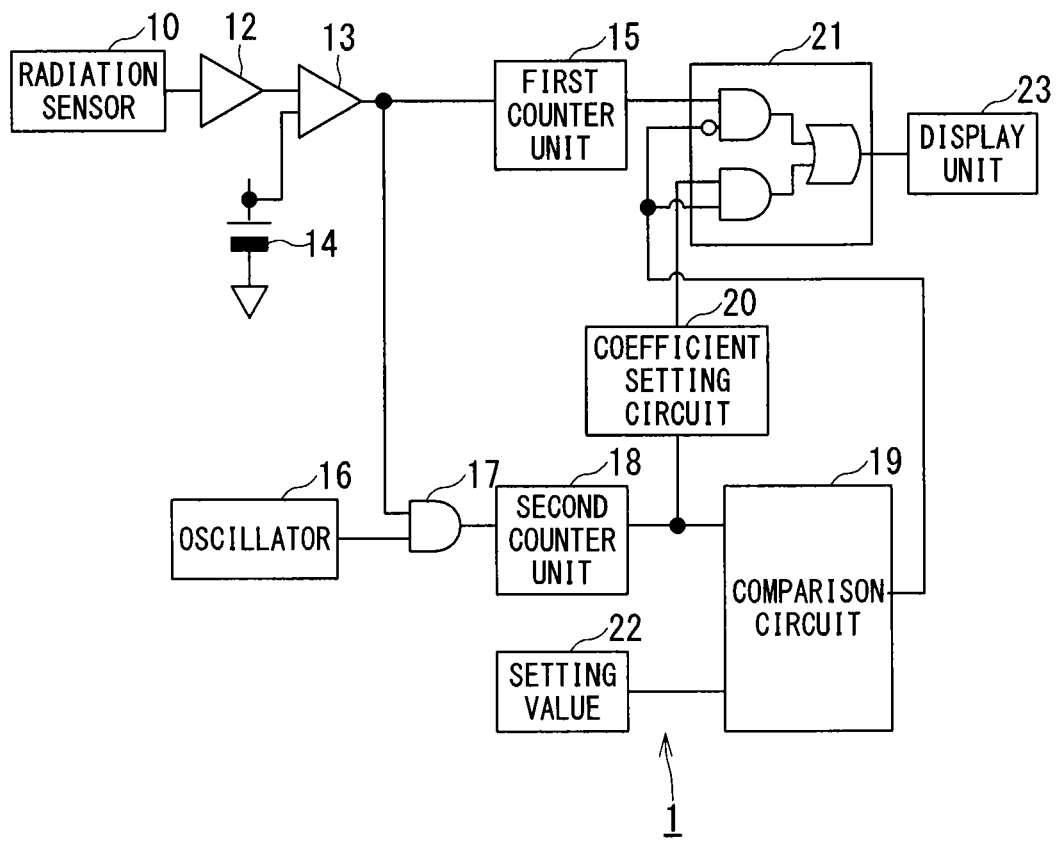
FIG. 1 is a circuit configuration diagram of a radiation measurement apparatus according to first embodiment.

FIG. 1 is a circuit configuration diagram of a radiation measurement apparatus 1 according to the first embodiment.

The radiation measurement apparatus 1 includes a radiation sensor 10, a waveform shaping circuit 12, a comparator 13, a discrimination level setting unit 14, and a first counter unit 15, as a radiation measurement device.

When the radiation sensor 10 detects radiation, the radiation sensor 10 generates electric pulse. The waveform shaping circuit 12 converts the electric pulse into a pulse which can be counted by latter circuit. The comparator 13 discriminates the converted pulse output from the waveform shaping circuit 12. The discrimination level setting unit 14 outputs setting voltage as discrimination level in the discrimination level setting unit 14 to the comparator 13. The first counter unit 15 counts the number of detection pulses as an output of the comparator 13 for a predetermined length of time.

The radiation measurement apparatus 1 includes an oscillator 16, an AND circuit 17, a second counter unit 18, a comparison circuit 19, a coefficient setting circuit 20 and a selector 21, as a pile-up prevention device that prevents pile-up.

The oscillator 16 continuously generates periodic pulse (periodic signal) with predetermined period. The AND circuit 17 outputs logical product obtained by performing AND operation between the detection pulse output from the comparator 13 and the periodic pulse output from the oscillator 16. The second counter unit 18 counts the number of signal output from the AND circuit 17 for predetermined length of time. The comparison circuit 19 outputs a logic signal which is "true" in a case where a value output from the second counter unit 18 is equal or more (not less) than a setting value 22 and a logic signal which is "false" in a case where a value of the second counter unit 18 is less than the setting value 22. The coefficient setting circuit 20 sets predetermined coefficient which is multiplied by the value output from the second counter unit 18. In a case where the output from the comparison circuit 19 is false, the selector 21 (display control circuit) outputs a count value of the first counter unit 15. Further, in a case where the output from the comparison circuit 19 is true, the selector 21 outputs a value obtained by multiplying the count value of the second counter unit 18 by a coefficient.

Further, the radiation measurement apparatus 1 includes a display unit 23 which displays the output value of the first counter unit 15 and the output value of the second counter unit 18. The output values are output from the selector 21.

Next, an operation of the radiation measurement apparatus 1 according to the first embodiment will be described.

FIG. 2 (which includes FIG. 2A to 2E) is an explanation view illustrating an aspect of a pulse generated in the comparator 13, the oscillator 16 and the AND circuit 17, in the event that a pile-up is not generated. FIG. 2A is an explanation view illustrating electric pulses 31 output from the radiation sensor 10, FIG. 2B is an explanation view illustrating shaped pluses 32 shaped by the waveform shaping circuit 12 and then output from the waveform shaping circuit 12, FIG. 2C is an explanation view illustrating detection pulses 33 output from the comparator 13, FIG. 2D is an explanation view illustrating periodic pulses 34 output from the oscillator 16, and FIG. 2E is an explanation view illustrating the output signal 35 output from the AND circuit 17.

Figure 2A:
FIG. 2A is a view illustrating an electric pulse output from a radiation sensor.
Figure 2B:
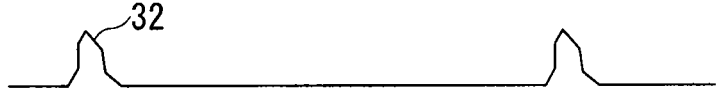
FIG. 2B is a view illustrating a shaped pulse shaped by a wave shaping circuit and then output from the wave shaping circuit.
Figure 2C:
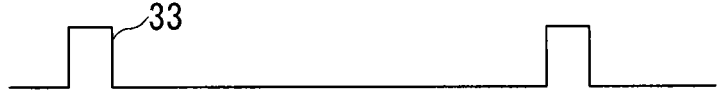
FIG. 2C is a view illustrating detection pulse output from the comparator.
Figure 2D:
FIG. 2D is a view illustrating periodic pulse output from the oscillator.
Figure 2E:
FIG. 2E is a view illustrating an output signal output from the AND circuit.

If the radiation sensor 10 detects radiation, as illustrated in FIG. 2A, the electric pulse 31 is generated. The waveform shaping circuit 12 shapes the electric pulse 31 into the shaped pulse 32 of which width is several micro-seconds (µs), illustrated in FIG. 2B. In a case where a wave height value of the shaped pulse 32 is larger than a voltage set in the discrimination level setting unit 14, the comparator 13 outputs the detection pulse (detection signal) 33 that represents 1 (High level), illustrated in FIG. 2C. Since the width of the shaped pulse 32 is several µs, the detection pulse 33 as an output of the comparator 13 becomes pulse of which width is several µs. The output of the comparator 13 is output to the first counter unit 15. The first counter unit 15 counts the detection pulse 33 for the predetermined length of time.

The detection pulse 33 is simultaneously output to the AND circuit 17. The AND circuit 17 calculates logical product between the detection pulse 33 output from the comparator 13 and the periodic pulse 34 output from the oscillator 16. That is, the AND circuit 17 outputs the periodic pulse 34 output from the oscillator 16 as output signal 35 to the second counter unit 18 while the comparator 13 outputs 1 (High level) signal (while the detection pulse 33 is output). The second counter unit 18 counts an output of the AND circuit 17 for a predetermined length of time. The width of the periodic pulse 34 is adequately small and, for instance, about one-fifth of the width of the detection pulse 33. It is set so as to always output the periodic pulse 34 to the second counter unit 18 while the shaped pulse 32 is generated.

The comparison circuit 19 compares the value counted by the second counter unit 18 with the setting value 22. The setting value 22 is arbitrarily selected a value which can be determined whether the radiation measurement apparatus 1 becomes pile-up state or not, and set. The comparison circuit 19 outputs a logic signal which is false in a case where the value of the second counter unit 18 is less than the setting value 22, i.e., in a case where the radiation measurement apparatus 1 does not become pile-up state but the count value of the output signal 35 is small.

If the output of the comparison circuit 19 is false, the selector 21 outputs the output value of the first counter unit 15 to the display unit 23. The display unit 23 displays actual count value which corresponds to the entering number of the radiation.

Herein, FIG. 3 (which includes FIGS. 3A to 3E) is explanation view illustrating an aspect of a pulse generated in the comparator 13, the oscillator 16, and the AND circuit 17, in the event that a pile-up is generated.

As illustrated in FIG. 3A, in a case where the count number of the electrical pulse 31 in the radiation sensor 10 is large number, as illustrated in FIG. 3B, the radiation measurement apparatus 1 becomes the pile-up state thereby overlapping the shaped pulses 32. As a result of becoming the pile-up state, as illustrated in FIG. 3C, since the detection pulses 33 of the comparator 13 also overlaps, the detection pulses 33 overlapped each other broadens pulse width thereof. Thus, even though radiation is strong, since the number of the detection pulses 33 decreases, the count value counted by the first counter unit 15 for the predetermined length of time becomes small.

The AND circuit 17 outputs the periodic pulse 34 output from the oscillator 16 as output signal 35 to the second counter unit 18 while the comparator 13 outputs 1 (High level) signal (while the detection pulse 33 is output). That is, although the count value of the first counter unit 15 decreases, the output signal 35 increases in proportion to width of the detection pulse 33. Therefore, the count value of the second counter unit 18 increases.

The comparison circuit 19 compares the value counted by the second counter unit 18 with the setting value 22. The comparison circuit 19 outputs a logic signal which is true in a case where the value of the second counter unit 18 is equal and more than the setting value 22, i.e., in a case where the count value of the output signal 35 is large by becoming pile-up state.

If the output of the comparison circuit 19 is true, the coefficient setting circuit 20. The selector 21 outputs a calculation value (which is based on the count value of the second counter unit 18) of the coefficient setting circuit 20 which multiplies the value output from the second counter unit 18 by the coefficient to the display unit 23. The display unit 23 reflects a actual radiation count value and then displays the value. That is, the radiation sensor 10 becomes pile-up state and the output from the first counter unit 15 of which count value becomes small is not displayed. Incidentally, the coefficient setting circuit 20 is included in the radiation sensor 10 so that output value becomes successive value in case of switching between the count value of the first counter unit 15 and the output value of the second counter unit 18, and arbitrarily sets the coefficient thereof.

The radiation measurement apparatus 1 in first embodiment detects whether the shaped pulse 32 becomes the pile-up state based on the count value of the second counter unit 18. When the pile-up state of the shaped pulse 32 is detected, the radiation measurement apparatus 1 switches from the count value of the first counter unit 15 to the output value of the second counter unit 18. As a result, the count value displayed in the display unit 23 does not become smaller and becomes large value which reflects a state in real radioactivity. Thus, the radiation measurement apparatus 1 can prevent the operator from faultily recognizing radioactivity without depending on skill and knowledge level, regarding radiation measurement, of the operator.

Incidentally, in a case where the count value of the second counter unit 18 is larger than the setting value 22, the radiation measurement apparatus 1 according to first embodiment may be configured so as to set predetermined value differing from actual count value (present count value) of the first counter unit 15 in the first counter unit 15, and thereby display the value set in the first counter unit 15 as count value in the display unit 23.

FIG. 4 is a circuit configuration diagram of a radiation measurement apparatus 41 according to another example of the first embodiment. Incidentally, it is noted that the same reference numerals or characters in the radiation measurement apparatus 41 are assigned to the same or similar components and parts as those in the radiation measurement apparatus 1, and the duplicated description thereof is omitted (not described).

The radiation measurement apparatus 41 includes the radiation sensor 10, the shaping circuit 12, the comparator 13, the discrimination level setting unit 14, and the first counter unit 15, as the radiation measurement device. Further, the radiation measurement apparatus 41 includes the oscillator 16, the AND circuit 17, the second counter unit 18, and the comparison circuit 42, as the pile-up prevention device that prevents the pile-up. Furthermore, the radiation measurement apparatus 41 includes the display unit 23.

The comparison circuit 42 outputs the logical signal which is true in the event that the value of the second counter unit 18 is equal and larger than the setting value 22 and the logical signal which is false in the event that the value of the second counter unit 18 is less than the setting value 22. In the first counter unit 15, a predetermined value is set as setting value in a case where an output of the comparison circuit 42 is the true logical signal.

An operation of the radiation measurement apparatus 41 as another example will be explained.

The comparison circuit 42 compares the count value of the second counter unit 18 with the setting value 22. In a case where the count value of the second counter unit 18 is less than the setting value 22, that is, in case of not being pile-up state, since the comparison circuit 42 outputs a logic signal which is false, the first counter unit 15 outputs actual count value to the display unit 23. The display unit 23 displays a count value corresponding to a detection number of radiation.

In a case where the count value of the second counter unit 18 becomes equal and more than the setting value 22, that is, in case of becoming the pile-up state, the comparison circuit 42 outputs a logic signal which is true. The comparison circuit 42 outputs the true logic signal and therefore subjects the first counter unit 15 to output value preliminarily set as the count value. The preliminarily set value is, for example, a maximum value of the first counter unit 15. The maximum value is larger than a count value after the count value of the first counter unit 15 is reduced by occurring pile-up. The count value of the first counter unit 15, being set by the comparison circuit 42 is output to the display unit 23 and displayed in the display unit 23.

In the radiation measurement apparatus 41, because the count value of the first counter unit 15 is preset as large value, even if the pile-up state is detected, the count value displayed in the display unit 23 does not become smaller. The radiation measurement apparatus 41 displays large value, and is therefore possible to prevent the operator from faultily recognizing radioactivity without depending on skill and knowledge level, regarding radiation measurement, of the operator.

Further, as the radiation measurement apparatus 41 may omit the selector 21 which is included in the radiation measurement apparatus 1, a configuration of the radiation measurement apparatus 41 may be simplified.

Second Embodiment

A second embodiment of a radiation measurement apparatus according to the present invention will be described with reference to the accompanying drawings.

Figure 5:
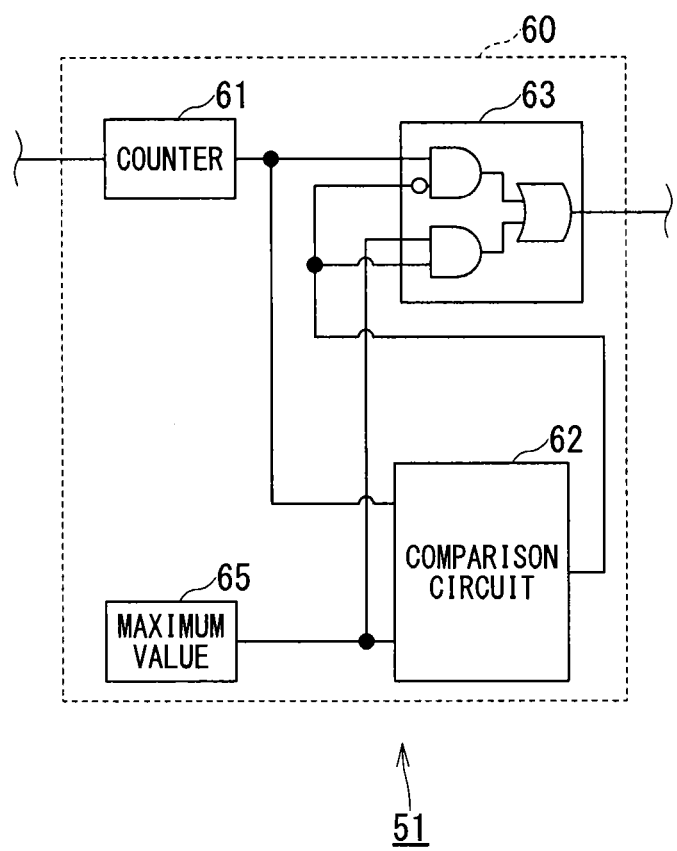
FIG. 5 is a circuit configuration diagram of a first counter unit of a radiation measurement apparatus according to second embodiment.

FIG. 5 is a circuit configuration diagram of a first counter unit 60 of a radiation measurement apparatus 51 according to second embodiment.

The different point between the radiation measurement apparatus 51 according to the second embodiment and the radiation measurement apparatus in the first embodiment is that the first counter unit 60 includes a component for preventing an operator from wrong determination caused by overflow of the first counter unit 60. In the radiation measurement apparatus 51, a component other than the first counter unit 60 is substantially as the same component of the radiation measurement apparatus 1 according to the first embodiment, and is omitted (not illustrated) in FIG. 5. Further, it is noted that the same reference numerals or characters in the radiation measurement apparatus 51 are assigned to the same or similar components and parts as those in the radiation measurement apparatus 1, and the duplicated description thereof is omitted.

The radiation measurement apparatus 51 includes the radiation sensor 10, the shaping circuit 12, the comparator 13, the discrimination level setting unit 14 (please refer to FIG. 1), and the first counter unit 60. Further, the radiation measurement apparatus 51 includes the oscillator 16, the AND circuit 17, the second counter unit 18, and the comparison circuit 19 (please refer to FIG. 1), as the pile-up prevention device that prevents the pile-up. Namely, the radiation measurement apparatus 51 may omit (not include) the pile-up prevention device.

The first counter unit 60 includes a counter 61, a comparison circuit 62, and a selector 63, as the pile-up prevention device that prevents pile-up.

The counter 61 counts the number of signal output from the comparator 13 for predetermined length of time. The comparison circuit 62 outputs a logic signal which is true in a case where a count value of the counter 61 reaches a maximum value 65 and a logic signal which is false in a case where the count value of the counter 61 is less than (does not reach) the maximum value 65. In a case where the comparison circuit 62 outputs the logical signal which is false, the selector 63 outputs actual count value of the counter 61. Further, in a case where the comparison circuit 62 outputs the logical signal which is true, the selector 63 outputs the maximum value 65 of the counter 61.

Next, an operation of the radiation measurement apparatus 51 according to the second embodiment will be explained.

If the radiation sensor 10 detects radiation, the electric pulse 31 is generated. The waveform shaping circuit 12 shapes the electric pulse 31 into the shaped pulse 32 of which width is several micro-seconds (μs). In a case where a wave height value of the shaped pulse 32 is larger than a voltage set in the discrimination level setting unit 14, the comparator 13 outputs the detection pulse (detection signal) 33 that represents 1 (High level). Since the width of the shaped pulse 32 is several μs, the detection pulse 33 as an output of the comparator 13 becomes pulse of which width is several μs. The output of the comparator 13 is output to the counter 61 of the first counter unit 60. The counter 61 counts the detection pulse 33 for the predetermined length of time.

The comparison circuit 62 compares the count value of the counter 61 with the maximum value 65. If the count value of the counter 61 is less than the maximum value 65, the comparison circuit 62 outputs a logic signal which is false. The selector 63 outputs actual count value of the counter 61 the maximum value 65 to the display unit 23. The display unit 23 displays the count value of the counter 61.

Meanwhile, there is a case where the count value of the counter 61 becomes the maximum value 65, that is, the count value of the counter 61 reaches a measurable maximum value. In this case, the comparison circuit 62 outputs a logic signal which is true. Thus, the selector 63 outputs the maximum value 65 of the counter 61 to the display unit 23 until a predetermined timing (for example, next measurement is started). The display unit 23 displays the maximum value 65 of the counter 61.

As a result of procedure described above, the counter value of the counter 61 does not become smaller than the maximum value 65 by occurring overflow, and is held.

In the radiation measurement apparatus 51 according to the second embodiment, the first counter unit 60 (the counter 61) detects whether the count value thereof reaches the maximum value 65, and switches the count value of the first counter unit 60 from actual count value to the maximum value 65. As a result, the radiation measurement apparatus 51 according to the second embodiment can prevent the output value output to the display unit 23 from becoming overflowed value, and therefore prevent the operator from faultily recognizing radioactivity.

Incidentally, in a case where the count value of the counter 61 reaches to the maximum value 65, the radiation measurement apparatus 51 according to the second embodiment may be configured so as to set the maximum value 65 in the first counter unit 15, and thereby display the maximum value 65 as count value in the display unit 23.

Figure 6:
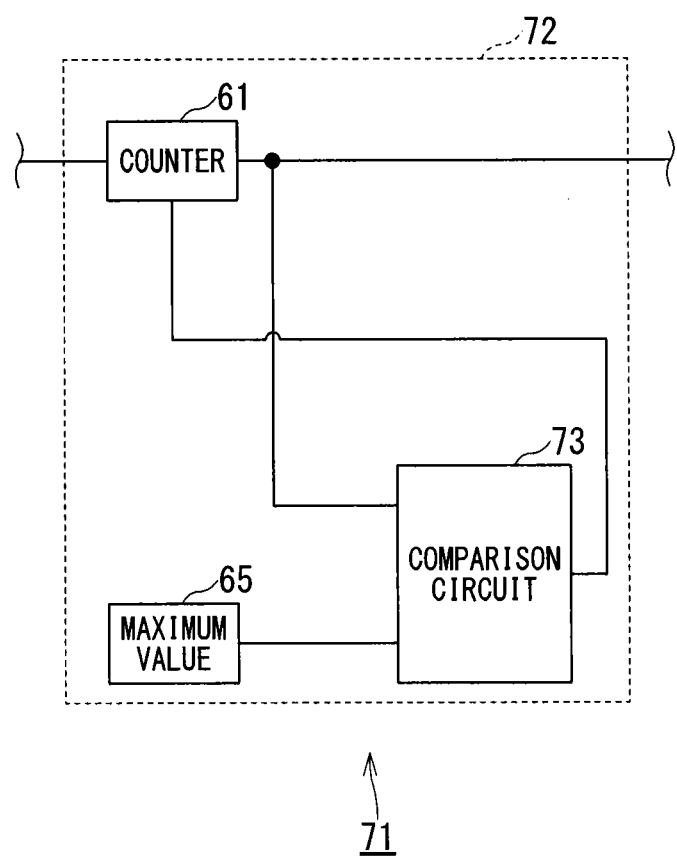
FIG. 6 is a circuit configuration diagram of a radiation measurement apparatus as another example of the second embodiment.

FIG. 6 is a circuit configuration diagram of a radiation measurement apparatus 71 as another example of the second embodiment. Incidentally, the same reference numerals or characters in the radiation measurement apparatus 71 are assigned to the same or similar components and parts as those in the radiation measurement apparatus 51, and the duplicated description thereof is omitted.

The first counter unit 72 includes a counter 61 and a comparison circuit 73, as an overflow prevention device that prevents an overflow.

The comparison circuit 73 outputs a logic signal which is true to the counter 61 in the case where the count value of the counter 61 reaches to the maximum value 65, and a logic signal which is false to the counter 61 in a case where the count value of the counter 61 is less than the maximum value 65. The counter 61 outputs actual count value in a case where the logic signal output from the comparison circuit 73 is false, and the maximum value 65 which is set by the comparison circuit 73 in a case where the logic signal output from the comparison circuit 73 is true.

The radiation measurement apparatus 71 can achieve the effect of the radiation measurement apparatus 51 and omit the selector 63. Therefore, a configuration of the radiation measurement apparatus 71 can be simplified.

Incidentally, in the second embodiment, the value which is compared with the counter 61 is not limited to the maximum value 65 and may be another value which is more than the maximum value 65.

Third Embodiment

A third embodiment of a radiation measurement apparatus according to the present invention will be described with reference to the accompanying drawings.

Figure 7:
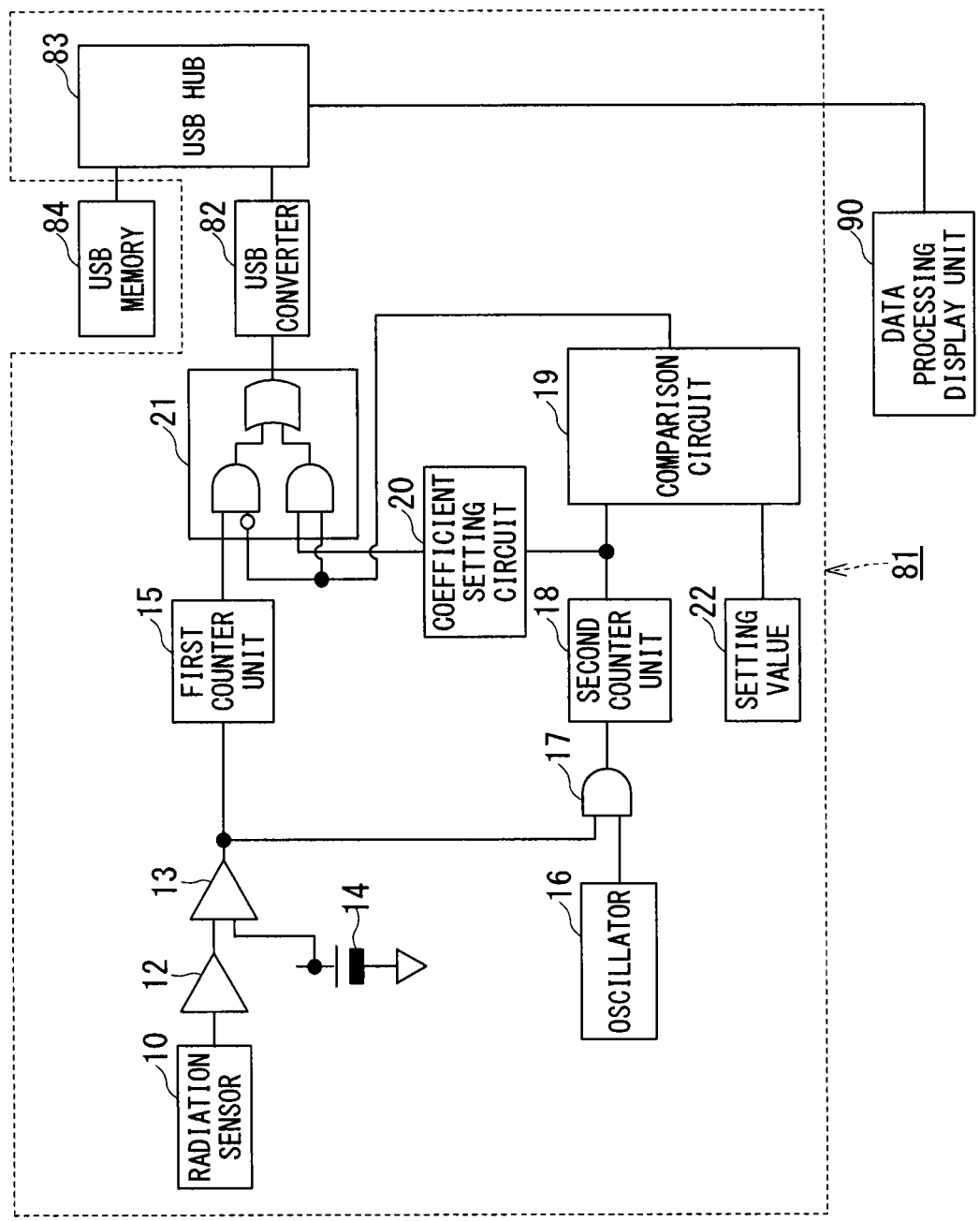
FIG. 7 is a circuit configuration diagram of a radiation measurement apparatus according to third embodiment.

FIG. 7 is a circuit configuration diagram of a radiation measurement apparatus 81 according to third embodiment.

The different point between the radiation measurement apparatus 81 according to the third embodiment and each of the radiation measurement apparatuses according to the first and second embodiments is that, for the sake of improving maintenance ease of the radiation measurement apparatus 81, the radiation measurement apparatus 81 further includes a USB convertor 82, a USB hub 83, and a USB memory 84. It is noted that the same reference numerals or characters in the radiation measurement apparatus 81 are assigned to the same or similar components and parts as those in the radiation measurement apparatus 1, and the duplicated description thereof is omitted.

The radiation measurement apparatus 81 includes the radiation sensor 10, the waveform shaping circuit 12, the comparator 13, a discrimination level setting unit 14, and a first counter unit 15, as a radiation measurement device. Further, the radiation measurement apparatus 81 includes the oscillator 16, the AND circuit 17, the second counter unit 18, and the comparison circuit 19, as a pile-up prevention device that prevents pile-up.

Furthermore, the radiation measurement apparatus 81 includes the USB convertor 82, the USB hub 83, and the USB memory 84. The USB convertor 82 converts measurement data output from the selector 21 into serial data of USB standard and then outputs the serial data. The USB hub 83 as an output device connects the radiation measurement apparatus 81 with a data processing display unit 90, and performs data transmission/reception and so on. The USB memory 84 as a memory device stores unique information of the radiation measurement apparatus 81 therein. The unique information is, for instance, information such as a calibration value of sensitivity of the radiation measurement apparatus 81 or the like, the production number of the radiation measurement apparatus 81, usage and maintenance history, or the like.

The data processing display unit 90 connected with the radiation measurement apparatus 81 processes and displays measurement data of the radiation measurement apparatus 81.

Next, an operation of the radiation measurement apparatus 81 according to the third embodiment will be explained.

The USB convertor 82 converts measurement data output from the selector 21 into serial data of USB standard and then outputs the serial data to the USB hub 83. The serial data is transmitted to the data processing display unit 90 through the USB hub 83. The data processing display unit 90 processes measurement data (the count values of the first and second counters 15 and 18) output from the selector 21 and unique information of the radiation measurement apparatus 81, stored in the USB memory 84 by performing required data procedure.

The data processing display unit 90, for example, reads out the sensitivity of the radiation sensor 10 from the USB memory 84 and calibrates the count number of the first counter unit 15 output from the selector 21 on the basis of the sensitivity of the radiation sensor 10, being unique information of the radiation measurement apparatus 81.

In the radiation measurement apparatus 81 according to the third embodiment, since the unique information of the radiation measurement apparatus 81 is stored in the USB memory 84, the radiation measurement apparatus 81 can smoothly move to measurement mode based on the unique information even if it is necessary to replace the radiation measurement apparatus 81 or the data processing display unit 90 with another one due to breakdown of the radiation measurement apparatus 81 or the data processing display unit 90.

For example, the radiation measurement apparatus 81 can calibrate the count value of the radiation sensor 10 based on the calibration value of the radiation measurement apparatus 81, read out from the USB memory 84, and therefore display the measurement data which is calibrated, in the data processing display unit 90. Thus, even if it is necessary to replace instrument such as the radiation measurement apparatus 81, the calibration thereof can be eliminated. If there is backup radiation measurement apparatus 81 or backup data processing display unit 90, the operator can immediately use backup radiation measurement apparatus 81 or backup data processing display unit 90 after the operator replaces with it.

Further, even an operator that does not know calibration method of the radiation measurement apparatus 81, if the operator only has to change the radiation measurement apparatus 81, can use the radiation measurement apparatus 81 without needing cumbersome work.

The USB memory 84 as memory unit may be included in the radiation measurement apparatus 81 or the data processing display unit 90.

Although some embodiments of the present invention are described, the above-described embodiments are presented as some examples. Accordingly, it is noted that the present invention is not limited to the above-described embodiments. Since the above-described embodiments which are new embodiments can be embodied in various forms other than the specific embodiments described above, various omissions, substitutions, and changes may be made without departing from the spirit and scope of the invention. These embodiments and modifications thereof are included within the sprit and scope of the invention and are included within the scope of the invention as disclosed in the claims and equivalents thereof.

REFERENCE NUMERALS 1, 41, 51, 71, 81 - - - radiation measurement apparatus
10 - - - radiation sensor
12 - - - waveform shaping circuit
13 - - - comparator
14 - - - discrimination level setting unit
15, 60, 72 - - - first counter unit
16 - - - oscillator
17 - - - AND circuit
18 - - - second counter unit
19, 42, 62, 73 - - - comparison circuit
20 - - - coefficient setting circuit
21, 63 - - - selector
22 - - - setting value
23 - - - display unit
61 - - - counter
65 - - - maximum value
82 - - - USB converter
83 - - - USB hub
84 - - - USB memory
90 - - - data processing display unit

The invention claimed is:

1. A radiation measurement apparatus comprising:
a sensor that generates a detection signal in case of detecting a radiation;
a first counter that counts the number of the detection signal;
an oscillator that generates a periodic signal with predetermined period;
an AND circuit that outputs a logical product obtained by operating an AND operation between the detection signal and the periodic signal;

a second counter that counts the number of a signal output from the AND circuit; and a display control circuit that selects for display a count value of the first counter in a case where a count value of the second counter is less than a first predetermined value or a value which is different from the count value of the first counter in a case where the count value of the second counter is not less than the first predetermined value.

2. The radiation measurement apparatus according to claim 1, wherein the display control circuit selects for display a value based on the count value of the second counter in the case where the count value of the second counter is not less than the first predetermined value.

3. The radiation measurement apparatus according to claim 2, further comprising:

a comparison circuit that determines whether the count value of the second counter is not less than the first predetermined value, wherein the display control circuit selects for display the count value of the second counter in the case where the count value of the second counter is not less than the first predetermined value.

4. The radiation measurement apparatus according to claim 1, wherein the first counter sets a second predetermined value as the count value of the first counter, and wherein the display control circuit selects for display the count value of the first counter after being set at the second predetermined value, in the case where the count value of the second counter is not less than the first predetermined value.

5. The radiation measurement apparatus according to claim 4, further comprising a comparison circuit that determines whether the count value of the second counter is not less than the first predetermined value, and newly sets the second predetermined value as the count value of the first counter when the value counted by the second counter is not less than the first predetermined value.

6. The radiation measurement apparatus according to claim 1, wherein the display control circuit selects for display a third predetermined value which is preliminarily set in a case where the count value of the first counter reaches to maximum count value.

7. The radiation measurement apparatus according to claim 6, the third predetermined value is a maximum value counted by the first counter.

8. The radiation measurement apparatus according to claim 6, further comprising:

a comparison circuit that determines whether the count value of the first counter reaches a maximum value or not, wherein the display control circuit selects for display the third predetermined value in the case where the count value of the first counter reaches to the maximum count value.

9. The radiation measurement apparatus according to claim 6, further comprising a comparison circuit that determines whether the count value of the first counter reaches a maximum value or not, and sets the count value of the first counter at the third predetermined value in the case where the count value of the first counter reaches the maximum value.

10. The radiation measurement apparatus according to claim 1, further comprising:

a memory that stores an unique information of the radiation measurement apparatus; and an output unit that reads out the unique information stored in the memory, and outputs the count value of the first counter and the unique information to an external equipment.

11. A radiation measurement apparatus comprising:

a sensor that generates a detection signal in case of detecting a radiation;

a counter that counts the number of the detection signal; and a display control circuit that selects for display an actual count value of the counter in a case where the actual count value of the counter is less than a maximum value of the counter or a predetermined value which is different from the actual count value of the counter in a case where the actual count value of the counter reaches the maximum value.

* * * * *